(No Model.) 2 Sheets—Sheet 1.
H. C. ATKINSON.
SOLDERING CLAMP FOR EAVES TROUGHS AND SPOUTS.
No. 406,616. Patented July 9, 1889.
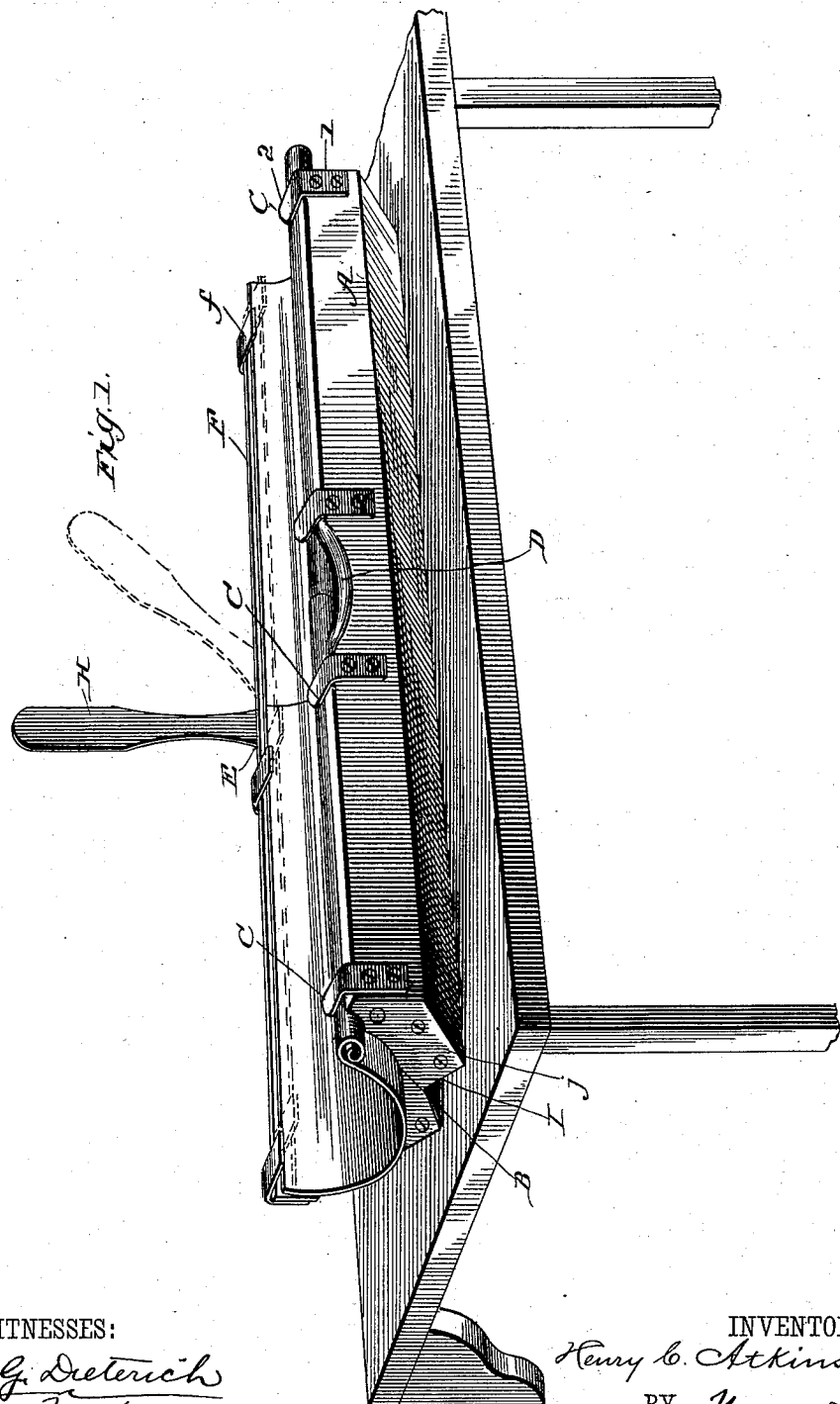
WITNESSES:
Fred G. Dieterich
P. B. Turpin
INVENTOR:
Henry C. Atkinson
BY Munn & Co
ATTORNEYS.

(No Model.) 2 Sheets—Sheet 2.
H. C. ATKINSON.
SOLDERING CLAMP FOR EAVES TROUGHS AND SPOUTS.
No. 406,616. Patented July 9, 1889.
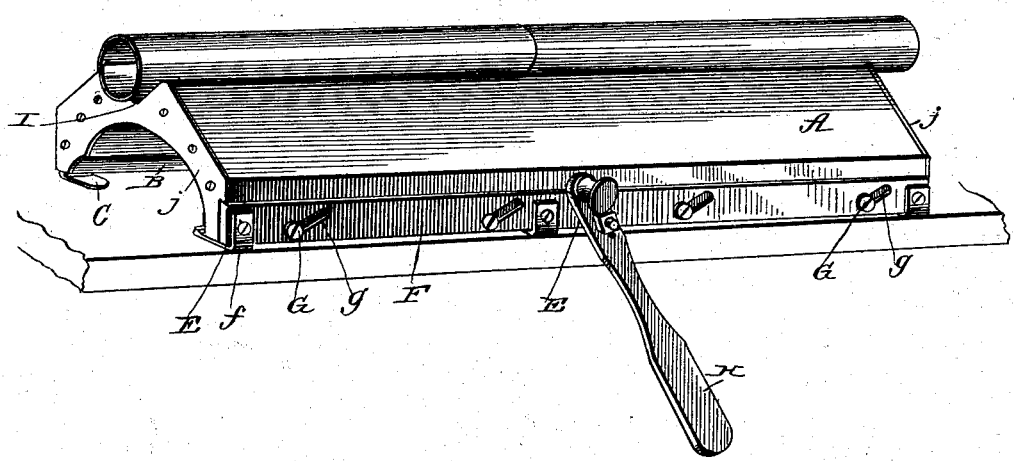
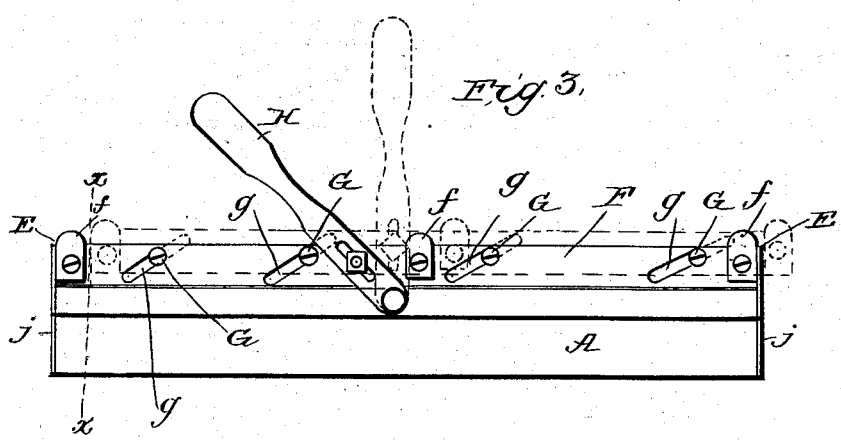
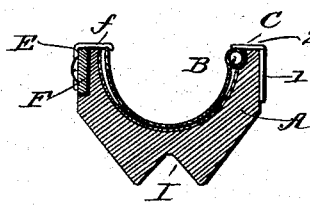
WITNESSES:
Fred G. Dieterich
P. B. Turpin
INVENTOR:
Henry C. Atkinson
BY Munn & Co.
ATTORNEYS.

UNITED STATES PATENT OFFICE.

HENRY CATE ATKINSON, OF SCOTTVILLE, KENTUCKY, ASSIGNOR OF ONE-HALF TO WILLIAM T. WELCH, OF SAME PLACE.

SOLDERING-CLAMP FOR EAVES-TROUGHS AND SPOUTS.

SPECIFICATION forming part of Letters Patent No. 406,616, dated July 9, 1889.

Application filed November 30, 1888. Serial No. 292,341. (No model.)

*To all whom it may concern:*

Be it known that I, HENRY CATE ATKINSON, of Scottville, in the county of Allen and State of Kentucky, have invented a new and useful Improvement in Eaves-Trough and Spouting Machines, of which the following is a specification.

My invention is an improved machine for use in soldering together the sections to form eaves-troughs, and which is also useful in soldering the sections of spouting.

The invention consists in the novel constructions and combinations of parts, as will be hereinafter described and claimed.

In the drawings, Figure 1 is a perspective view of my machine as in use for holding trough-sections. Fig. 2 is a similar view of the machine as when holding spout-sections. Fig. 3 is a rear elevation of the machine; and Fig. 4, a cross-section on about line *x x*, Fig. 3.

The machine, as shown, comprises a body part A, which is formed in its upper side with a longitudinal trough-like cavity B, conformed in cross-section to the shape of the eaves-trough. At one edge, usually the front, of the said cavity B are provided stop bearings or seats C, against which the beaded edge of the trough-sections bear. These bearings are preferably angle-bars having one arm 1 secured to the outer side of body A and their other arms 2 extended inward over the edge of the cavity B. The front edge of the body A, which edge is provided with the bearings C, is provided with a cut-out portion or recess D, which enables the soldering-iron to be passed forward over the crown of the beads of the trough-sections at the joint of the latter.

At the edge of the cavity B, opposite the bearings C, I provide the presser E, which bears upon the edge of the trough-sections and is adjustable or movable, so that it may be caused to press firmly against one of the edges of the trough-sections and clamp the said sections firmly within the cavity B, with their beaded edges bearing against the bearings or seats C. This means for clamping the trough-sections brings the overlapping portions of the trough-sections at the joints of the latter closely together, so that the soldering can be effectually and neatly effected, and but the smallest quantity of solder is required to accomplish the best results. The presser is preferably formed of a bar F, having lugs or short bars *f*, which bear upon the edge of the trough-sections. This bar F is so supported and operated that its portions bearing on the trough-sections move thereagainst with a sliding and downward motion, which very effectually presses the sections into position, and yet avoids any injury to the trough-sections by the contact of the presser. In the construction shown the bar F is held against the side edge or face of the body A by means of screws or studs G, passed through diagonal slots *g* in the bar, so that as such bar is moved longitudinally the inclination of such slots *g* will give the bar a downward movement, thus producing the sliding and downward motion desired. To operate the presser I provide the hand-lever H, pivoted at its lower end to the body, connected above said pivot with the bar F and extended above the body A, in position to be grasped by the operator.

In operation the machine is placed on the bench or other support in front of the workman, with the lever at the rear side of the machine. A joint or section of the gutter with the bead properly formed may be taken in each hand, and the bead on the right-hand section be fitted into the left-hand bead and the sections brought to a level and placed in the machine, with the bead lying under bearings C, the joint being opposite the recess D and the rear edge of the sections being under the overlapping portions *f* of the presser. Then by moving handle H, and thereby operating said presser, the sections may be pressed closely together, as desired, bringing the gutter to a dead-level, making it perfectly straight, and at the same time forming the close joint to be soldered, resulting in a great saving in solder. The recess D enables the soldering-iron to be passed almost entirely around the bead before removing the trough from the machine. In the side of the body A opposite the cavity B—that is to say, in the under side of the said body—I form a longitudinal gutter or groove I, which is adapted to receive telescoped spout-sections, which may be soldered by turning them in said groove, the machine being inverted when used in the soldering of spouting.

It will be understood that the machine may be formed of such length as to receive any suitable number of lengths or sections of trough or spouting, as desired.

In the construction shown I secure end plates $j$ to the wooden body-piece, and such construction is preferred, as it renders the machine more rigid and durable.

Having thus described my invention, what I claim as new is—

1. A machine, substantially as described, comprising a body portion provided with a longitudinal trough-like cavity and having at one edge of such cavity a stop, bearing, or seat, the presser-bar arranged at the opposite edge of such cavity extended approximately the full length thereof and having a portion or portions whereby to engage the trough-sections, such presser-bar being movable longitudinally in the direction of length of the cavity and downward, and a lever whereby to operate such bar, all substantially as described, whereby the portions engaging the edge of the trough-sections move thereagainst with a sliding and downward motion, as and for the purposes specified.

2. The combination of the body portion having cavity B and provided at one edge of such cavity with a stop, bearing, or seat, the bar F, arranged at the opposite side of the said cavity and provided with a portion or portions to engage the trough-sections and with diagonal slots $g$, the screws or studs G, passed through said slots, and the lever, all substantially as set forth.

3. A machine, substantially as described, consisting of a body-piece provided in one side with a gutter or groove I and in its other side with a trough-like cavity B and having a stop, seat, or bearing at one edge of such cavity, and a presser at the opposite edge of such cavity, substantially as set forth.

HENRY CATE ATKINSON.

Witnesses:
JOHN D. CALVERT,
J. S. CARPENTER.